United States Patent
Sun et al.

(10) Patent No.: US 11,205,252 B2
(45) Date of Patent: Dec. 21, 2021

(54) METHOD AND DEVICE FOR ENHANCING BRIGHTNESS AND CONTRAST OF VIDEO IMAGE

(71) Applicant: SHENZHEN LONTIUM SEMICONDUCTOR TECHNOLOGY CO., LTD., Guangdong (CN)

(72) Inventors: Xu Sun, Guangdong (CN); Jixing Ye, Guangdong (CN); Wenhan Yin, Guangdong (CN); Ligang Hu, Guangdong (CN); Shiyong Liang, Guangdong (CN); Changfang Yue, Guangdong (CN); Rongliang Yu, Guangdong (CN)

(73) Assignee: SHENZHEN LONTIUM SEMICONDUCTOR TECHNOLOGY CO., LTD., Shenzhen (CN)

( * ) Notice: Subject to any disclaimer, the term of this patent is extended or adjusted under 35 U.S.C. 154(b) by 101 days.

(21) Appl. No.: 16/715,649

(22) Filed: Dec. 16, 2019

(65) Prior Publication Data
US 2020/0211165 A1 Jul. 2, 2020

(30) Foreign Application Priority Data
Dec. 26, 2018 (CN) .......................... 201811603253.2

(51) Int. Cl.
*G06T 5/00* (2006.01)
*G06T 7/00* (2017.01)

(52) U.S. Cl.
CPC ................ *G06T 5/007* (2013.01); *G06T 7/00* (2013.01); *G06T 2207/10024* (2013.01)

(58) Field of Classification Search
CPC . G06T 5/007; G06T 7/00; G06T 2207/10024; G06T 2207/20008; G06T 5/009; G06T 5/008
See application file for complete search history.

(56) References Cited

U.S. PATENT DOCUMENTS 7,684,639 B2 3/2010 Zhao et al.
7,809,188 B1 10/2010 Zhou
(Continued)

FOREIGN PATENT DOCUMENTS

CN 101286231 A 10/2008
CN 101599171 A * 12/2009
(Continued)

OTHER PUBLICATIONS

Office Action for Taiwanese Patent Application No. 108134455, dated Jul. 13, 2020.
(Continued)

*Primary Examiner* — Chan S Park
*Assistant Examiner* — Daniel C Chang
(74) *Attorney, Agent, or Firm* — Merchant & Gould P.C.

(57) ABSTRACT

A method and a device for enhancing brightness and contrast of a video image are provided. In the method, an inflection point, a truncation point, a maximum value of a brightness component, and a minimum value of the brightness component of an image frame to be processed are determined based on the brightness component of the image frame to be processed, a piecewise linear function is determined based on the inflection point, and brightness and contrast enhancement processing is performed on the image frame to be processed based on the piecewise linear function. Compared with the brightness and contrast enhancement method in
(Continued)

conventional art, the method and device of the application can achieve better brightness and contrast enhancement effects.

16 Claims, 6 Drawing Sheets

(56) References Cited

U.S. PATENT DOCUMENTS

| | | | |
|---|---|---|---|
| 9,767,544 B2 | 9/2017 | Batur et al. | |
| 9,830,846 B2 | 11/2017 | Choe et al. | |
| 2010/0321520 A1* | 12/2010 | Zhou | G06T 5/009 348/222.1 |
| 2013/0083248 A1* | 4/2013 | Suzuki | G06T 5/007 348/678 |

FOREIGN PATENT DOCUMENTS

| | | | |
|---|---|---|---|
| CN | 101599171 A | 12/2009 | |
| CN | 102231264 A | 11/2011 | |
| CN | 103034985 A | 4/2013 | |
| CN | 103530847 A | 1/2014 | |
| CN | 105741245 A | 7/2016 | |
| CN | 108805829 A | 11/2018 | |
| CN | 108810506 A | 11/2018 | |
| TW | 20130335 A | 8/2018 | |

OTHER PUBLICATIONS

Office Action for Chinese Patent Application No. 201811603253.2, dated Feb. 3. 2021.

\* cited by examiner

METHOD AND DEVICE FOR ENHANCING BRIGHTNESS AND CONTRAST OF VIDEO IMAGE

CROSS-REFERENCE TO RELATED APPLICATIONS

The present application claims priority to Chinese Patent Application No. 201811603253.2, titled "METHOD AND DEVICE FOR ENHANCING BRIGHTNESS AND CONTRAST OF VIDEO IMAGE", filed on Dec. 26, 2018 with the China National Intellectual Property Administration, which is incorporated herein by reference in its entirety.

FIELD

The present disclosure relates to the technical field of image processing, and in particular to, a method and a device for enhancing brightness and contrast of a video image.

BACKGROUND

Image quality may be degraded during transmission, reception and processing of video signals, resulting in poor image display, thereby failing visual requirements of users for high definition and high image quality. In the conventional technology, image enhancement technology is often used to enhance display effect of an image. The image enhancement technology performs brightness and contrast enhancing processing on the image according to practical needs, thereby obtaining an image that has better visual effects and is more useful for a specific application.

Among the commonly used brightness and contrast enhancement technologies of video image, noise may be enhanced during the process of brightness and contrast enhancement of the video image in some of them, image details may easily get lost during the process of brightness and contrast enhancement of the video image in some of them, the video image is prone to color distortion during the process of brightness and contrast enhancement of the video image in some of them, and a lot of complicated computations are required during the process of brightness and contrast enhancement of the video image in some of them, which cannot meet real-time requirements for video image processing. The above various cases have a bad influence on the brightness and contrast enhancement effects.

Therefore, how to improve the display effect of the image frame in the video while satisfying the real-time performance of the video processing has become a technical problem to those skilled in the art.

SUMMARY

In view of the above problems, a method and a device for enhancing brightness and contrast of a video image are provided in the present disclosure.

A method for enhancing brightness and contrast of a video image is provided, the method including:
  obtaining a brightness component of an image frame to be processed;
  determining, based on the brightness component of the image frame to be processed, an inflection point, a truncation point, a maximum value of the brightness component and a minimum value of the brightness component of the image frame to be processed;
  determining a piecewise linear function based on the inflection point, the truncation point, the maximum value of the brightness component and the minimum value of the brightness component; and
  performing brightness and contrast enhancement processing on the image frame to be processed based on the piecewise linear function.

In an embodiment, determining, based on the brightness component of the image frame to be processed, the inflection point and the truncation point of the image frame to be processed includes:
  determining a type of the image frame to be processed based on the brightness component of the image frame to be processed;
  determining a target way of determination corresponding to the type of the image frame to be processed; and
  determining the inflection point and the truncation point of the image frame to be processed in the target way of determination.

In an embodiment, determining the type of the image frame to be processed based on the brightness component of the image frame to be processed includes:
  making statistics of the brightness component of the image frame to be processed to obtain a statistical result;
  determining, based on the statistical result, a trend mark value of the image frame to be processed, where the trend mark value includes a low brightness mark value, a medium brightness mark value, and a high brightness mark value; and
  determining the type of the image frame to be processed based on the trend mark value of the image frame to be processed.

In an embodiment, making the statistics of the brightness component of the image frame to be processed to obtain the statistical result includes:
  determining, from a first pixel to a last pixel of the image frame to be processed sequentially, an $n^{th}$ grayscale order that a brightness value of a brightness component of a current pixel falls into, where n is an integer greater than or equal to 1 and less than or equal to 32;
  increasing a count of a first-order statistical counter corresponding to the $n^{th}$ grayscale order by one;
  determining whether the count of the first-order statistical counter corresponding to the $n^{th}$ grayscale order is equal to a width of the image frame to be processed;
  increasing a count of a second-order statistical counter corresponding to the $n^{th}$ grayscale order by one, in a case that the count of the first-order statistical counter corresponding to the $n^{th}$ grayscale order is equal to the width of the image frame to be processed; and
  determining counts of thirty-two first-order statistical counters and counts of thirty-two second-order statistical counters that are included in thirty-two grayscale orders as the statistical result.

In an embodiment, determining, based on the statistical result, the trend mark value of the image frame to be processed includes:
  calculating a sum sum2_all of the counts of the thirty-two second-order statistical counters;
  calculating a sum sum2_l of counts of sixteen second-order statistical counters included in a low field of grayscale orders;
  calculating a sum sum2_m of counts of sixteen second-order statistical counters included in a middle field of grayscale orders;
  calculating a sum sum2_h of counts of sixteen second-order statistical counters included in a high field of grayscale orders; and calculating the trend mark value of the image frame to be processed according to following formula:

$$ted\_l = \begin{cases} 1, & if(sum2\_l - sum2\_h) > (sum\_all/4) \\ 0, & others \end{cases}$$

$$ted\_h = \begin{cases} 1, & if(sum2\_h - sum2\_l) > (sum\_all/4) \\ 0, & others \end{cases}$$

$$ted\_m = \begin{cases} 1, & if: sum2\_m > sum2\_all/2 \\ 2, & else\ if: sum2\_m > sum2\_all/4 \\ 0, & others \end{cases}$$

where the low field of grayscale orders includes first to sixteenth grayscale orders, the middle field of grayscale orders includes ninth to twenty-fourth grayscale orders, the high field of grayscale orders includes seventeenth to thirty-second grayscale orders, ted_l is the low brightness mark value, ted_m is the medium brightness mark value, and ted_h is the high brightness mark value.

In an embodiment, determining the type of the image frame to be processed based on the trend mark value of the image frame to be processed includes:

determining that the type of the image frame to be processed is a first type, in case that the ted_l is equal to 1, the ted_m is equal to 0 and the ted_h is equal to 0, where a pixel concentrated area corresponding to the first type is an interval from 0 to 63;

determining that the type of the image frame to be processed is a second type, in case that the ted_l is equal to 1, the ted_m is equal to 1 and the ted_h is equal to 0, where a pixel concentrated area corresponding to the second type is an interval from 64 to 127;

determining that the type of the image frame to be processed is a third type, in case that the ted_l is equal to 1, the ted_m is equal to 2 and the ted_h is equal to 0, where a pixel concentrated area corresponding to the third type is an interval from 0 to 127;

determining that the type of the image frame to be processed is a fourth type, in case that the ted_h is equal to 1, the ted_m is equal to 0 and the ted_l is equal to 0, where a pixel concentrated area corresponding to the fourth type is an interval from 192 to 255;

determining that the type of the image frame to be processed is a fifth type, in case that the ted_h is equal to 1, the ted_m is equal to 1 and the ted_l is equal to 0, where a pixel concentrated area corresponding to the fifth type is an interval from 128 to 191;

determining that the type of the image frame to be processed is a sixth type, in case that the ted_h is equal to 1, the ted_m is equal to 2 and the ted_l is equal to 0, where a pixel concentrated area corresponding to the sixth type is an interval from 128 to 255;

determining that the type of the image frame to be processed is a seventh type, in case that the ted_l is equal to 0, the ted_h is equal to 0 and the ted_m is equal to 0, where a pixel concentrated area corresponding to the seventh type is an interval from 64 to 191;

determining that the type of the image frame to be processed is an eighth type, in case that the ted_l is equal to 0, the ted_h is equal to 0 and the ted_m is equal to 1, where a pixel concentrated area corresponding to the eighth type is an interval from 0 to 255; and determining that the type of the image frame to be processed is a ninth type, in case that the ted_l is equal to 0, the ted_h is equal to 0 and the ted_m is equal to 2, where a pixel concentrated area corresponding to the ninth type is an interval from 192 to 255.

In an embodiment, determining the target way of determination corresponding to the type of the image frame to be processed includes:

determining, in case that the type of the image frame to be processed is the first type, that the target way of determination includes: the inflection point is a medium brightness point corresponding to a maximum count of second-order statistical counters in the interval from 0 to 63, a distance between a low truncation point and the inflection point is equal to or less than 12 unit brightness gaps, a distance between a high truncation point and the inflection point is equal to or less than 32 unit brightness gaps and k is 1.25 or 1.325 in the interval from 0 to 63;

determining, in case that the type of the image frame to be processed is the second type, that the target way of determination includes: the inflection point is intermediate medium brightness point corresponding to a maximum count of second-order statistical counters in the interval from 64 to 127, the distance between the low truncation point and the inflection point is equal to or less than 36 unit brightness gaps, the distance between the high truncation point and the inflection point is equal to or less than 36 unit brightness gaps and k is 1.25 or 1.325 in the interval from 64 to 127;

determining, in case that the type of the image frame to be processed is the third type, that the target way of determination includes: the inflection point is a medium brightness point corresponding to a maximum count of second-order statistical counters in the interval from 0 to 127, the distance between the low truncation point and the inflection point is equal to or less than 36 unit brightness gaps, the distance between the high truncation point and the inflection point is equal to or less than 68 unit brightness gaps and k is 1.125 or 1.25 in the interval from 0 to 127;

determining, in case that the type of the image frame to be processed is the fourth type, that the target way of determination includes: the inflection point is a medium brightness point corresponding to a maximum count of second-order statistical counters in the interval from 192 to 255, the distance between the low truncation point and the inflection point is equal to or less than 32 unit brightness gaps, the distance between the high truncation point and the inflection point is equal to or less than 12 unit brightness gaps and k is 1.25 or 1.325 in the interval from 192 to 255;

determining, in case that the type of the image frame to be processed is the fifth type, that the target way of determination includes: the inflection point is a medium brightness point corresponding to a maximum count of second-order statistical counters in the interval from 128 to 191, the distance between the low truncation point and the inflection point is equal to or less than 40 unit brightness gaps, the distance between the high truncation point and the inflection point is equal to or less than 32 unit brightness gaps and k is 1.25 or 1.325 in the interval from 128 to 191;

determining, in case that the type of the image frame to be processed is the sixth type, that the target way of determination includes: the inflection point is a medium brightness point corresponding to a maximum count of second-order statistical counters in the interval from 128 to 255, the distance between the low truncation point and the inflection point is equal to or less than 68 unit brightness gaps, the distance between the high truncation point and the inflection point is equal to or less than 63 unit brightness gaps and k is 1.125 or 1.25 in the interval from 128 to 255;

determining, in case that the type of the image frame to be processed is the seventh type, that the target way of determination includes: the inflection point is a medium brightness point corresponding to a maximum count second-order statistical counters in the interval from 64 to 191, the distance between the low truncation point and the inflection point is equal to or less than 20 unit brightness gaps, the distance between the high truncation point and the inflection point is equal to or less than 20 unit brightness gaps, the low truncation point and the high truncation point are located in an interval including the interval from 64 to 191 and k is 1.25 or 1.325 in the interval from 64 to 191;

determining, in case that the type of the image frame to be processed is the eighth type, that the target way of determination includes: the inflection point is a medium brightness point corresponding to a maximum count of second-order statistical counters in the interval from 0 to 255, the truncation point is 0 and 255 and k is 1.125 or 1.25 in the interval from 0 to 255; and determining, in case that the type of the image frame to be processed is the ninth type, that the target way of determination includes: two inflection points are medium brightness points corresponding to maximum counts of second-order statistical counters in the interval from 0 to 64 and in the interval from 192 to 255, respectively, the truncation point is located in an interval including the interval from 0 to 64 and the interval from 192 to 255 and k is 1.125 or 1.25 in the interval from 0 to 64 and in the interval from 192 to 255, where k is a slope.

A device for enhancing brightness and contrast of a video image includes:

a brightness component obtaining unit, configured to obtain a brightness component of an image frame to be processed;

a parameter determination unit, configured to determine, based on the brightness component of the image frame to be processed, an inflection point, a truncation point, a maximum value of the brightness component and a minimum value of the brightness component of the image frame to be processed;

a piecewise linear function determination unit, configured to determine a piecewise linear function based on the inflection point, the truncation point, the maximum value of the brightness component and the minimum value of the brightness component; and a brightness and contrast enhancement processing unit, configured to perform brightness and contrast enhancement processing on the image frame to be processed based on the piecewise linear function.

A storage medium, on which a program is stored, where when being executed by a processor, the program configures a processor to perform the above method for enhancing brightness and contrast of a video image.

An electronic device includes a memory and a processor, where the memory is configured to store a program, and the processor is configured to execute the program to perform the above method for enhancing brightness and contrast of a video image.

With the above technical solution, in the method and device for enhancing brightness and contrast of a video image according to the present disclosure, an inflection point, a truncation point, a maximum value of a brightness component, and a minimum value of the brightness component of the image frame to be processed are determined based on the brightness component of the image frame to be processed, a piecewise linear function is determined based on the inflection point, and brightness and contrast enhancement processing is performed on the image frame to be processed based on the piecewise linear function. Compared with the brightness and contrast enhancement method in conventional art, the method and device of the present disclosure can achieve better brightness and contrast enhancement effects.

The above description is only an overview of the technical solution of the present disclosure. In order to understand the technical means of the present disclosure more clearly and make the above and other objects, features, and advantages of the present invention more comprehensible, specific embodiments of the present disclosure are described in the following.

BRIEF DESCRIPTION OF THE DRAWINGS

Various other advantages and benefits will become apparent to those of ordinary skill in the art upon reading the detailed description of the preferred embodiments below. The drawings are only for the purpose of illustrating preferred embodiments and are not to be considered as limiting the invention. Moreover, the same reference numerals are used throughout the drawings to refer to the same parts. In the drawings.

DETAILED DESCRIPTION OF EMBODIMENTS

The technical solution of the present invention is hereinafter described in detail with reference to the accompanying drawings. It is evident that the embodiments are only some exemplary embodiments of the present invention, and the present invention is not limited to such embodiments. Other embodiments that those skilled in the art obtain based on embodiments of the present disclosure also fall within the protection scope of the present disclosure.

Figure 1:
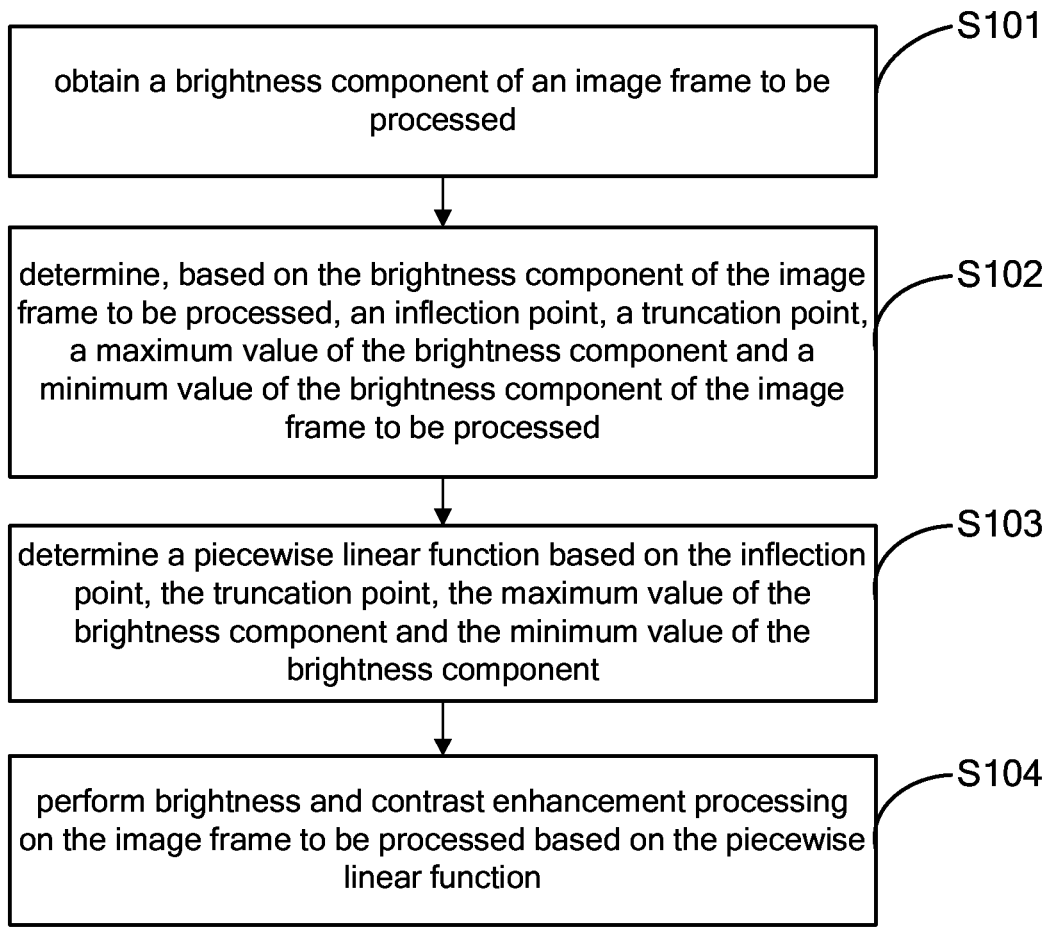
FIG. 1 is a schematic flowchart of a method for enhancing brightness and contrast of a video image according to an embodiment of the present disclosure.

Reference is made to FIG. 1. FIG. 1 is a schematic flowchart of a method for enhancing brightness and contrast of a video image according to an embodiment of the present disclosure, the method including steps 101 to 104.

Step S101 includes obtaining a brightness component of an image frame to be processed.

In an embodiment, the image frame to be processed may be obtained first, which may be any one frame of the video image. In a case that a color space of the image frame to be processed is YCbCr color space, brightness components of all pixels in the image frame to be processed are directly obtained and determined as the brightness component of the image frame to be processed. In a case that the color space of the image frame to be processed is RGB color space, the color space of the image frame to be processed is first converted into YCbCr color space, and the brightness components of all pixels in the image frame to be processed are then obtained and determined as the brightness component of the image frame to be processed.

In an embodiment, the conversion is performed according to the following equations:

$$Y = 0.257R + 0.504G + 0.098B$$

$$Cb = 0.439R + 0.368G + 0.071B$$

$$Cr = 0.148R + 0.291G + 0.439B$$

where, Y is the brightness component, Cb is a blue chrominance component, Cr is a red chrominance component, R is a color component of a red channel, G is a color component of a green channel, and B is a color component of a blue channel.

Step S102 includes determining, based on the brightness component of the image frame to be processed, an inflection point, a truncation point, a maximum value of the brightness component and a minimum value of the brightness component of the image frame to be processed.

Figure 2:
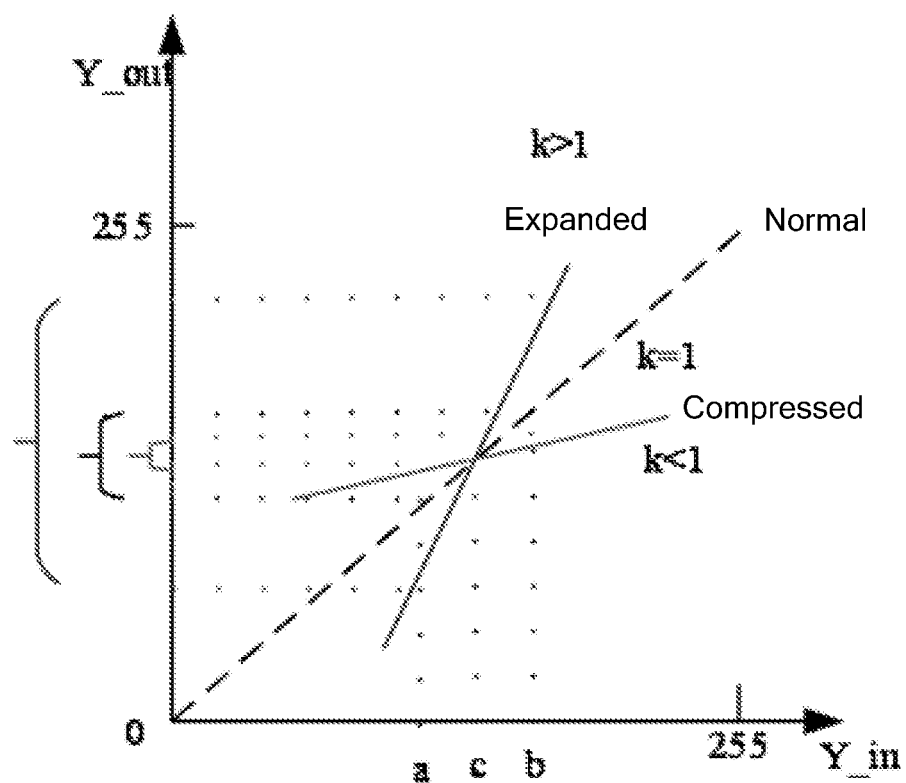
FIG. 2 is a schematic diagram of an inflection point and a truncation point of a method for enhancing brightness and contrast of a video image according to an embodiment of the present disclosure.

In an embodiment, the inflection point and the truncation point define an interval of the brightness component, which requires contrast enhancement, of the image frame to be processed. The inflection point is a point where an input brightness component is equal to an output brightness component in the interval of the brightness component, which requires contrast enhancement, of the image frame to be processed, and the truncation point is a boundary point of the interval of the brightness component, which requires contrast enhancement, of the image frame to be processed. As shown in FIG. 2, a slope k of a linear function of an image without brightness and contrast enhancement is 1, the slope k of the linear function of the image is increased to greater than 1 when the contrast needs to be enhanced, and the slope k of the linear function of the image is reduced to less than 1 when the contrast needs to be reduced. In FIG. 2, an intersection point c of the three straight lines is the inflection point, and two points a and b at two respective sides of c are truncation points.

Step S103 includes determining a piecewise linear function based on the inflection point, the truncation point, the maximum value of the brightness component and the minimum value of the brightness component.

Figure 3:
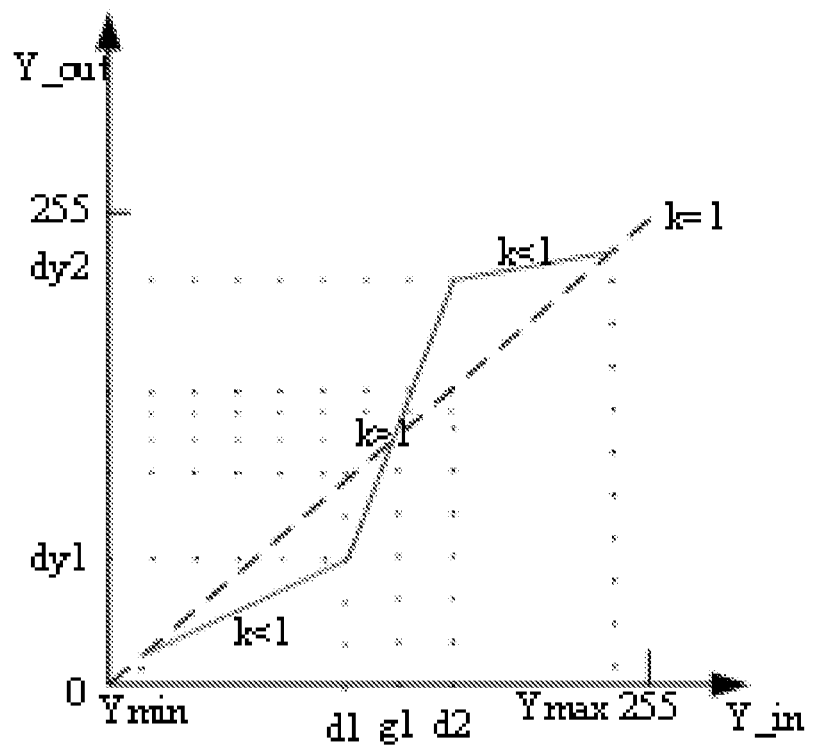
FIG. 3 is a schematic diagram of a piecewise linear function of a method for enhancing brightness and contrast of a video image according to an embodiment of the present disclosure.
Figure 4:
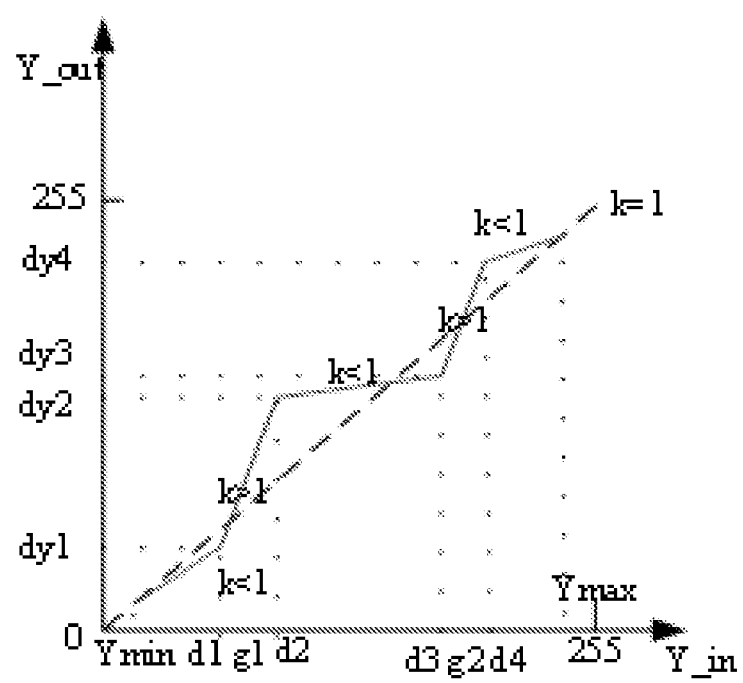
FIG. 4 is a schematic diagram of a piecewise linear function of a method for enhancing brightness and contrast of a video image according to another embodiment of the present disclosure.

In an embodiment as shown in FIGS. 3 and 4, Ymin is the minimum value of the brightness component, Ymax is the maximum value of the brightness component, g1 and g2 are inflection points, d1, d2, d3 and d4 are truncation points, and the piecewise linear function is determined according to a straight line equation in two-point form:

$$y = \frac{(x - x_1) \times (y_2 - y_1)}{(x_2 - x_1)} + y_1.$$

FIG. 3 shows a scenario with one inflection point, where (x1, y1) and (x2, y2) representing input and output in the straight line equation (x, y) in two-point form are (Ymin, Ymin) and (d1, dy1), (d1, dy1) and (d2, dy2), and (d2, dy2) and (Ymax, Ymax).

FIG. 4 shows a scenario with two inflection points, where (x1, y1) and (x2, y2) representing input and output in the straight line equation (x, y) in two-point form are (Ymin, Ymin) and (d1, dy1), (d1, dy1) and (d2, dy2), (d2, dy2) and (d3, dy3), (d3, dy3) and (d4, dy4), and (d4, dy4) and (Ymax, Ymax).

In an embodiment, determining, based on the brightness component of the image frame to be processed, the maximum value of the brightness component and the minimum value of the brightness component of the image frame to be processed includes:

determining that a maximum value of brightness values of brightness components of all the pixels of the image frame to be processed is the maximum value of the brightness component of the image frame to be processed; and determining that a minimum value of the brightness values of the brightness components of all the pixels of the image frame to be processed is the minimum value of the brightness component of the image frame to be processed.

Step S104 includes performing brightness and contrast enhancement processing on the image frame to be processed based on the piecewise linear function.

In the method for enhancing brightness and contrast of a video image in the present disclosure, an inflection point, a truncation point, a maximum value of a brightness component, and a minimum value of the brightness component of the image frame to be processed are determined based on the brightness component of the image frame to be processed, a piecewise linear function is determined based on the inflection point, and brightness and contrast enhancement processing is performed on the image frame to be processed based on the piecewise linear function. Compared with the brightness and contrast enhancement techniques commonly used in the conventional art, the method according to the present disclosure can achieve better brightness and contrast enhancement effects.

In a preferred embodiment of the present disclosure, when black level expansion is required, the minimum brightness value Ymin is reduced to Ymin/2, and when white level expansion is required, the maximum brightness value Ymax is increased to Ymax+(255−Ymax)/2.

It is understandable that in some embodiments of the present disclosure, the image frame subjected to the brightness and contrast enhancement processing as referred to in step 104 may be displayed on a display unit of an electronic device for viewing of a user. The electronic device may be any device that has a display panel and can display images, such as a cellphone, a computer, a tablet computer, a person digital assistant, or the like, which is not limited in the present disclosure.

Figure 5:
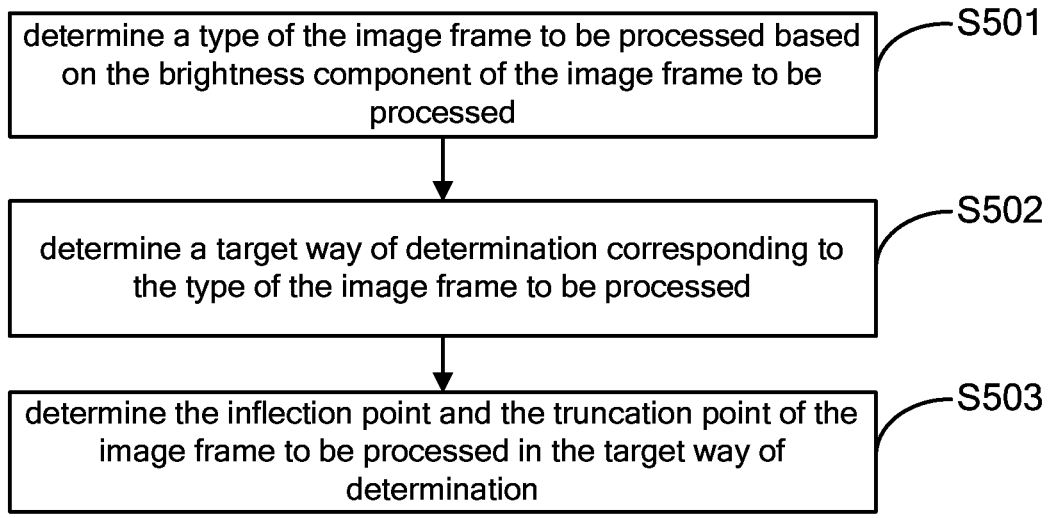
FIG. 5 is a schematic flowchart of a method for determining an inflection point and a truncation point of an image frame to be processed according to an embodiment of the present disclosure.

Reference is made to FIG. 5. FIG. 5 is a schematic flowchart of a method for determining an inflection point and a truncation point of an image frame to be processed according to an embodiment of the present disclosure, and the method includes:

step S501, determining a type of the image frame to be processed based on the brightness component of the image frame to be processed;

step S502, determining a target way of determination corresponding to the type of the image frame to be processed; and step S503, determining the inflection point and the truncation point of the image frame to be processed in the target way of determination.

It should be noted that the determination of the inflection point and the truncation point of the image frame to be processed is restricted by the type of the image frame to be processed, and different types correspond to different target ways of determination for determining different inflection points and the truncation point.

Figure 6:
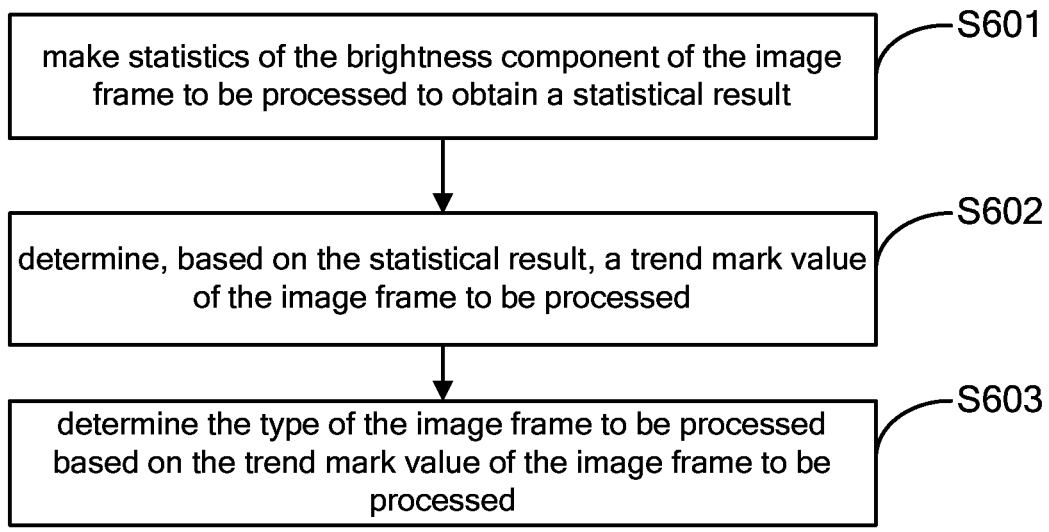
FIG. 6 is a schematic flowchart of a method for determining a type of an image frame to be processed according to an embodiment of the present disclosure.

Reference is made to FIG. 6. FIG. 6 is a schematic flowchart of a method for determining a type of an image frame to be processed according to an embodiment of the present disclosure, and the method includes steps 601 to 603.

Step S601 includes making statistics of the brightness component of the image frame to be processed to obtain a statistical result.

The brightness values of the brightness component of the image frame to be processed are between 0 and 255, that is, 256 grayscales (also referred to as gray level in the art). In the present disclosure, from brightness value 0 to brightness value 255, each eight brightness values form a grayscale order, that is, the brightness values from 0 to 7 form the first grayscale order (denoted as grayscale order 0), the brightness values from 8 to 15 form the second grayscale order (denoted as grayscale order 1), . . . , the brightness values from 248 to 255 form the thirty-second grayscale order (denoted as grayscale order 31). Each grayscale order corresponds to two statistical counters, a first-order statistical counter and a second-order statistical counter. The thirty-two grayscale orders are divided into three fields, where the first to sixteenth grayscale orders form a low field, the ninth to twenty-fourth grayscale orders form a medium field, and the seventh to thirty-second grayscale orders form a high field. In an embodiment, a gap between two adjacent brightness values may be referred to as a unit brightness gap, for example, a distance between brightness values 1 and 2 is one unit brightness gap and a distance between brightness values 54 and 64 is ten unit brightness gaps.

In an embodiment, making the statistics of the brightness component of the image frame to be processed to obtain the statistical result includes:

determining, from a first pixel to a last pixel of the image frame to be processed sequentially, an $n^{th}$ grayscale order that a brightness value of a brightness component of a current pixel falls into, where n is an integer greater than or equal to 1 and less than or equal to 32;

increasing a count of a first-order statistical counter corresponding to the $n^{th}$ grayscale order by one;

determining whether the count of the first-order statistical counter corresponding to the $n^{th}$ grayscale order is equal to a width of the image frame to be processed;

increasing a count of a second-order statistical counter corresponding to the $n^{th}$ grayscale order by one, in a case that the count of the first-order statistical counter corresponding to the $n^{th}$ grayscale order is equal to the width of the image frame to be processed; and determining counts of thirty-two first-order statistical counters and counts of thirty-two second-order statistical counters that are included in the thirty-two grayscale orders as the statistical result.

Step S602 includes determining, based on the statistical result, a trend mark value of the image frame to be processed.

The trend mark value includes a low brightness mark value, a medium brightness mark value, and a high brightness mark value.

In an embodiment, a sum sum2_all of the counts of the thirty-two second-order statistical counters is calculated, a sum sum2_l of counts of sixteen second-order statistical counters included in a low field of grayscale orders is calculated, a sum sum2_m of counts of sixteen second-order statistical counters included in a middle field of grayscale orders is calculated, and a sum sum2_h of counts of sixteen second-order statistical counters included in a high field of grayscale orders is calculated. The low field of grayscale orders includes first to sixteenth grayscale orders, the middle field of grayscale orders includes ninth to twenty-fourth grayscale orders, and the high field of grayscale orders includes seventeenth to thirty-second grayscale orders.

The trend mark value of the image frame to be processed is calculated according to following formula:

$$ted\_l = \begin{cases} 1, & \text{if}(sum2\_l - sum2\_h) > (sum\_all/4) \\ 0, & \text{others} \end{cases}$$

$$ted\_h = \begin{cases} 1, & \text{if}(sum2\_h - sum2\_l) > (sum\_all/4) \\ 0, & \text{others} \end{cases}$$

$$ted\_m = \begin{cases} 1, & \text{if: } sum2\_m > sum2\_all/2 \\ 2, & \text{else if: } sum2\_m > sum2\_all/4 \\ 0, & \text{others} \end{cases}$$

where ted_l is the low brightness mark value, ted_m is the medium brightness mark value, and ted_h is the high brightness mark value.

Step S603 includes determining the type of the image frame to be processed based on the trend mark value of the image frame to be processed.

In an embodiment, in a case that the ted_l is equal to 1, the ted_m is equal to 0, and the ted_h is equal to 0, the type of the image frame to be processed is determined to be a first type, and a pixel concentrated area corresponding to the first type is an interval from 0 to 63. It should be noted that in some embodiments of the present disclosure, the pixel concentrated area refers to a brightness value interval which brightness values of more than a considerable percentage of the pixels of the image frame to be processed fall within. This considerable percentage may be predetermined in an appropriate manner, which, for example, may be 35% or 50% and is not limited in the present disclosure.

In a case that the ted_l is equal to 1, the ted_m is equal to 1, and the ted_h is equal to 0, the type of the image frame to be processed is determined to be a second type, and a pixel concentrated area corresponding to the second type is an interval from 64 to 127.

In a case that the ted_l is equal to 1, the ted_m is equal to 2, and the ted_h is equal to 0, the type of the image frame to be processed is determined to be a third type, and a pixel concentrated area corresponding to the third type is an interval from 0 to 127.

In a case that the ted_h is equal to 1, the ted_m is equal to 0, and the ted_l is equal to 0, the type of the image frame to be processed is determined to be a fourth type, and a pixel concentrated area corresponding to the fourth type is an interval from 192 to 255.

In a case that the ted_h is equal to 1, the ted_m is equal to 1, and the ted_l is equal to 0, the type of the image frame to be processed is determined to be a fifth type, and a pixel concentrated area corresponding to the fifth type is an interval from 128 to 191.

In a case that the ted_h is equal to 1, the ted_m is equal to 2, and the ted_l is equal to 0, the type of the image frame to be processed is determined to be a sixth type, and a pixel concentrated area corresponding to the sixth type is an interval from 128 to 255.

In a case that the ted_l is equal to 0, the ted_h is equal to 0, and the ted_m is equal to 0, the type of the image frame to be processed is determined to be a seventh type, and a pixel concentrated area corresponding to the seventh type is an interval from 64 to 191.

In a case that the ted_l is equal to 0, the ted_h is equal to 0, and the ted_m is equal to 1, the type of the image frame to be processed is determined to be an eighth type, and a pixel concentrated area corresponding to the eighth type is an interval from 0 to 255.

In a case that the ted_l is equal to 0, the ted_h is equal to 0, and the ted_m is equal to 2, the type of the image frame to be processed is determined to be a ninth type, and a pixel concentrated area corresponding to the ninth type is an interval from 192 to 255.

In an embodiment, determining the target way of determination corresponding to the type of the image frame to be processed includes:

determining, in case that the type of the image frame to be processed is the first type, that the target way of determination includes: the inflection point is a medium brightness point corresponding to a maximum count of second-order statistical counters in the interval from 0 to 63, a distance between a low truncation point and the inflection point is equal to or less than 12 unit brightness gaps, a distance between a high truncation point and the inflection point is equal to or less than 32 unit brightness gaps and k is 1.25 or 1.325 in the interval from 0 to 63;

determining, in case that the type of the image frame to be processed is the second type, that the target way of determination includes: the inflection point is intermediate medium brightness point corresponding to a maximum count of second-order statistical counters in the interval from 64 to 127, the distance between the low truncation point and the inflection point is equal to or less than 36 unit brightness gaps, the distance between the high truncation point and the inflection point is equal to or less than 36 and k is 1.25 or 1.325 in the interval from 64 to 127;

determining, in case that the type of the image frame to be processed is the third type, that the target way of determination includes: the inflection point is a medium brightness point corresponding to a maximum count of second-order statistical counters in the interval from 0 to 127, the distance between the low truncation point and the inflection point is equal to or less than 36 unit brightness gaps, the distance between the high truncation point and the inflection point is equal to or less than 68 unit brightness gaps and k is 1.125 or 1.25 in the interval from 0 to 127;

determining, in case that the type of the image frame to be processed is the fourth type, that the target way of determination includes: the inflection point is a medium brightness point corresponding to a maximum count of second-order statistical counters in the interval from 192 to 255, the distance between the low truncation point and the inflection point is equal to or less than 32 unit brightness gaps, the distance between the high truncation point and the inflection point is equal to or less than 12 unit brightness gaps and k is 1.25 or 1.325 in the interval from 192 to 255;

determining, in case that the type of the image frame to be processed is the fifth type, that the target way of determination includes: the inflection point is a medium brightness point corresponding to a maximum count of second-order statistical counters in the interval from 128 to 191, the distance between the low truncation point and the inflection point is equal to or less than 40 unit brightness gaps, the distance between the high truncation point and the inflection point is equal to or less than 32 unit brightness gaps and k is 1.25 or 1.325 in the interval from 128 to 191;

determining, in case that the type of the image frame to be processed is the sixth type, that the target way of determination includes: the inflection point is a medium brightness point corresponding to a maximum count of second-order statistical counters in the interval from 128 to 255, the distance between the low truncation point and the inflection point is equal to or less than 68 unit brightness gaps, the distance between the high truncation point and the inflection point is equal to or less than 63 unit brightness gaps and k is 1.125 or 1.25 in the interval from 128 to 255;

determining, in case that the type of the image frame to be processed is the seventh type, that the target way of determination includes: the inflection point is a medium brightness point corresponding to a maximum count second-order statistical counters in the interval from 64 to 191, the distance between the low truncation point and the inflection point is equal to or less than 20 unit brightness gaps, the distance between the high truncation point and the inflection point is equal to or less than 20 unit brightness gaps, the low truncation point and the high truncation point are located in an interval including the interval from 64 to 191 and k is 1.25 or 1.325 in the interval from 64 to 191;

determining, in case that the type of the image frame to be processed is the eighth type, that the target way of determination includes: the inflection point is a medium brightness point corresponding to a maximum count of second-order statistical counters in the interval from 0 to 255, the truncation point is 0 and 255 and k is 1.125 or 1.25 in the interval from 0 to 255; and determining, in case that the type of the image frame to be processed is the ninth type, that the target way of determination includes: two inflection points are medium brightness points corresponding to maximum counts of second-order statistical counters in the interval from 0 to 64 and in the interval from 192 to 255, respectively, the truncation point is located in an interval including the interval from 0 to 64 and the interval from 192 to 255 and k is 1.125 or 1.25 in the interval from 0 to 64 and in the interval from 192 to 255, where k is a slope.

As an exemplary description, in the target way of determination corresponding to the first type, the interval from 0 to 63 corresponds to the first to the eighth grayscale orders, including eight second-order statistical counters. In the eight second-order statistical counters, the value of the second-order statistical counter corresponding to the first grayscale order (including the brightness values from 0 to 7) is the maximum, and the medium brightness point corresponding to the maximum value of the second-order counter is 4, which is obtained by rounding up 7/2.

Figure 7:
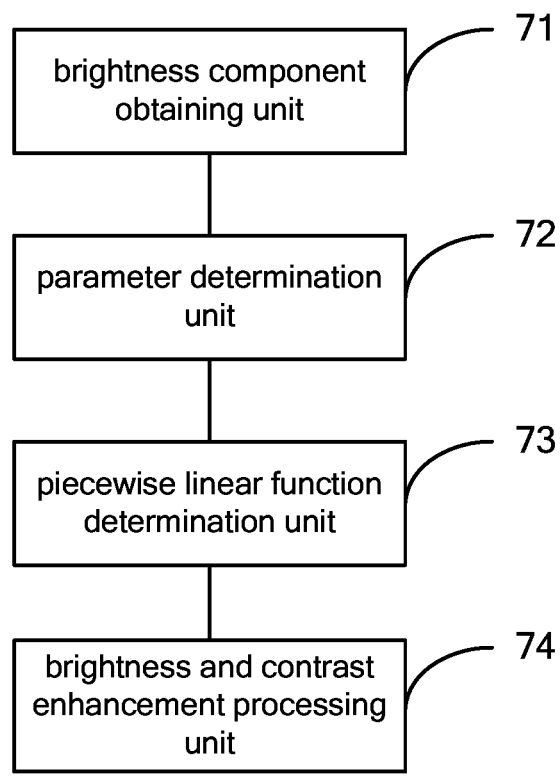
FIG. 7 is a structural diagram of a device for enhancing brightness and contrast of a video image according to an embodiment of the present disclosure.

Reference is made to FIG. 7. FIG. 7 is a structural diagram of a device for enhancing brightness and contrast of a video image according to an embodiment of the present disclosure, and the device includes:

- a brightness component obtaining unit 71, configured to obtain a brightness component of an image frame to be processed;
- a parameter determination unit 72, configured to determine, based on the brightness component of the image frame to be processed, an inflection point, a truncation point, a maximum value of the brightness component and a minimum value of the brightness component of the image frame to be processed;
- a piecewise linear function determination unit 73, configured to determine a piecewise linear function based on the inflection point, the truncation point, the maximum value of the brightness component and the minimum value of the brightness component; and
- a brightness and contrast enhancement processing unit 74, configured to perform brightness and contrast enhancement processing on the image frame to be processed based on the piecewise linear function.

In an embodiment, the parameter determination unit includes:

- a type determination subunit, configured to determine a type of the image frame to be processed based on the brightness component of the image frame to be processed;
- a subunit for determining way of determination, configured to determine a target way of determination corresponding to the type of the image frame to be processed; and
- a parameter determination subunit, configured to determine the inflection point and the truncation point of the image frame to be processed in the target way of determination.

In an embodiment, the type determination subunit is configured to:

- make statistics of the brightness component of the image frame to be processed to obtain a statistical result;
- determine, based on the statistical result, a trend mark value of the image frame to be processed, where the trend mark value includes a low brightness mark value, a medium brightness mark value, and a high brightness mark value; and
- determine the type of the image frame to be processed based on the trend mark value of the image frame to be processed.

In an embodiment, the type determination subunit is configured to:

- determine, from a first pixel to a last pixel of the image frame to be processed sequentially, an $n^{th}$ grayscale order that a brightness value of a brightness component of a current pixel falls into, where n is an integer greater than or equal to 1 and less than or equal to 32;
- increase a count of a first-order statistical counter corresponding to the $n^{th}$ grayscale order by one;
- determine whether the count of the first-order statistical counter corresponding to the $n^{th}$ grayscale order is equal to a width of the image frame to be processed;
- increase a count of a second-order statistical counter corresponding to the $n^{th}$ grayscale order by one, in a case that the count of the first-order statistical counter corresponding to the $n^{th}$ grayscale order is equal to the width of the image frame to be processed; and
- determine counts of thirty-two first-order statistical counters and counts of thirty-two second-order statistical counters that are included in thirty-two grayscale orders as the statistical result.

In an embodiment, the type determination subunit is configured to:

- calculate a sum sum2_all of the counts of the thirty-two second-order statistical counters;
- calculate a sum sum2_l of counts of sixteen second-order statistical counters included in a low field of grayscale orders;
- calculate a sum sum2_m of counts of sixteen second-order statistical counters included in a middle field of grayscale orders;
- calculate a sum sum2_h of counts of sixteen second-order statistical counters included in a high field of grayscale orders; and
- calculate the trend mark value of the image frame to be processed according to following formula:

$$ted\_l = \begin{cases} 1, & \text{if}(sum2\_l - sum2\_h) > (sum\_all/4) \\ 0, & \text{others} \end{cases}$$

$$ted\_h = \begin{cases} 1, & \text{if}(sum2\_h - sum2\_l) > (sum\_all/4) \\ 0, & \text{others} \end{cases}$$

$$ted\_m = \begin{cases} 1, & \text{if: } sum2\_m > sum2\_all/2 \\ 2, & \text{else if: } sum2\_m > sum2\_all/4 \\ 0, & \text{others} \end{cases}$$

where the low field of grayscale orders includes first to sixteenth grayscale orders, the middle field of grayscale orders includes ninth to twenty-fourth grayscale orders, the high field of grayscale orders includes seventeenth to thirty-second grayscale orders, ted_l is the low brightness mark value, ted_m is the medium brightness mark value, and ted_h is the high brightness mark value.

In an embodiment, the type determination subunit is configured to:

- determine that the type of the image frame to be processed is a first type in case that the ted_l is equal to 1, the ted_m is equal to 0, and the ted_h is equal to 0, where a pixel concentrated area corresponding to the first type is an interval from 0 to 63;
- determine that the type of the image frame to be processed is a second type in case that the ted_l is equal to 1, the ted_m is equal to 1, and the ted_h is equal to 0, where a pixel concentrated area corresponding to the second type is an interval from 64 to 127;
- determine that the type of the image frame to be processed is a third type in case that the ted_l is equal to 1, the ted_m is equal to 2, and the ted_h is equal to 0, where a pixel concentrated area corresponding to the third type is an interval from 0 to 127;

determine that the type of the image frame to be processed is a fourth type in case that the ted_h is equal to 1, the ted_m is equal to 0, and the ted_l is equal to 0, where a pixel concentrated area corresponding to the fourth type is an interval from 192 to 255;

determine that the type of the image frame to be processed is a fifth type in case that the ted_h is equal to 1, the ted_m is equal to 1, and the ted_l is equal to 0, where a pixel concentrated area corresponding to the fifth type is an interval from 128 to 191;

determine that the type of the image frame to be processed is a sixth type in case that the ted_h is equal to 1, the ted_m is equal to 2, and the ted_l is equal to 0, where a pixel concentrated area corresponding to the sixth type is an interval from 128 to 255;

determine that the type of the image frame to be processed is a seventh type in case that the ted_l is equal to 0, the ted_h is equal to 0, and the ted_m is equal to 0, where a pixel concentrated area corresponding to the seventh type is an interval from 64 to 191;

determine that the type of the image frame to be processed is an eighth type in case that the ted_l is equal to 0, the ted_h is equal to 0, and the ted_m is equal to 1, where a pixel concentrated area corresponding to the eighth type is an interval from 0 to 255; and determine that the type of the image frame to be processed is a ninth type in case that the ted_l is equal to 0, the ted_h is equal to 0, and the ted_m is equal to 2, where a pixel concentrated area corresponding to the ninth type is an interval from 192 to 255.

In an embodiment, the subunit for determining way of determination is configured to:

determine, in case that the type of the image frame to be processed is the first type, that the target way of determination includes: the inflection point is a medium brightness point corresponding to a maximum count of second-order statistical counters in the interval from 0 to 63, a distance between a low truncation point and the inflection point is equal to or less than 12 unit brightness gaps, a distance between a high truncation point and the inflection point is equal to or less than 32 unit brightness gaps and k is 1.25 or 1.325 in the interval from 0 to 63;

determine, in case that the type of the image frame to be processed is the second type, that the target way of determination includes: the inflection point is intermediate medium brightness point corresponding to a maximum count of second-order statistical counters in the interval from 64 to 127, the distance between the low truncation point and the inflection point is equal to or less than 36 unit brightness gaps, the distance between the high truncation point and the inflection point is equal to or less than 36 unit brightness gaps and k is 1.25 or 1.325 in the interval from 64 to 127;

determine, in case that the type of the image frame to be processed is the third type, that the target way of determination includes: the inflection point is a medium brightness point corresponding to a maximum count of second-order statistical counters in the interval from 0 to 127, the distance between the low truncation point and the inflection point is equal to or less than 36 unit brightness gaps, the distance between the high truncation point and the inflection point is equal to or less than 68 unit brightness gaps and k is 1.125 or 1.25 in the interval from 0 to 127;

determine, in case that the type of the image frame to be processed is the fourth type, that the target way of determination includes: the inflection point is a medium brightness point corresponding to a maximum count of second-order statistical counters in the interval from 192 to 255, the distance between the low truncation point and the inflection point is equal to or less than 32 unit brightness gaps, the distance between the high truncation point and the inflection point is equal to or less than 12 unit brightness gaps and k is 1.25 or 1.325 in the interval from 192 to 255;

determine, in case that the type of the image frame to be processed is the fifth type, that the target way of determination includes: the inflection point is a medium brightness point corresponding to a maximum count of second-order statistical counters in the interval from 128 to 191, the distance between the low truncation point and the inflection point is equal to or less than 40 unit brightness gaps, the distance between the high truncation point and the inflection point is equal to or less than 32 unit brightness gaps and k is 1.25 or 1.325 in the interval from 128 to 191;

determine, in case that the type of the image frame to be processed is the sixth type, that the target way of determination includes: the inflection point is a medium brightness point corresponding to a maximum count of second-order statistical counters in the interval from 128 to 255, the distance between the low truncation point and the inflection point is equal to or less than 68 unit brightness gaps, the distance between the high truncation point and the inflection point is equal to or less than 63 unit brightness gaps and k is 1.125 or 1.25 in the interval from 128 to 255;

determine, in case that the type of the image frame to be processed is the seventh type, that the target way of determination includes: the inflection point is a medium brightness point corresponding to a maximum count second-order statistical counters in the interval from 64 to 191, the distance between the low truncation point and the inflection point is equal to or less than 20 unit brightness gaps, the distance between the high truncation point and the inflection point is equal to or less than 20 unit brightness gaps, the low truncation point and the high truncation point are located in an interval including the interval from 64 to 191 and k is 1.25 or 1.325 in the interval from 64 to 191;

determine, in case that the type of the image frame to be processed is the eighth type, that the target way of determination includes: the inflection point is a medium brightness point corresponding to a maximum count of second-order statistical counters in the interval from 0 to 255, the truncation point is 0 and 255 and k is 1.125 or 1.25 in the interval from 0 to 255; and determine, in case that the type of the image frame to be processed is the ninth type, that the target way of determination includes: two inflection points are medium brightness points corresponding to maximum counts of second-order statistical counters in the interval from 0 to 64 and in the interval from 192 to 255, respectively, the truncation point is located in an interval including the interval from 0 to 64 and the interval from 192 to 255 and k is 1.125 or 1.25 in the interval from 0 to 64 and in the interval from 192 to 255, where k is a slope.

It should be noted that specific function implementations of the foregoing units have been described in detail in the method embodiments, and details are not described in this embodiment.

The device for enhancing brightness and contrast of a video image includes a processor and a memory, each of the foregoing units is stored in the memory as a program unit, and the processor executes the program unit stored in the memory to implement a corresponding function.

The processor contains a core, and the kernel calls the corresponding program unit from the memory. The number of the core is one or more, and the effects of brightness and contrast enhancement can be improved by adjusting the parameters of the core.

The memory may include a volatile memory, a random access memory (RAM), and/or a non-volatile memory in computer-readable media, such as read-only memory (ROM) or flash memory (flash RAM). The memory includes at least one memory chip.

A storage medium on which a program is stored is provided according to an embodiment of the present disclosure, where when being executed by a processor, the program configures a processor to perform the above method for enhancing brightness and contrast of a video image.

A processor is provided according to an embodiment of the present disclosure, where the processor is configured to execute a program to perform the above method for enhancing brightness and contrast of a video image.

An electronic device is provided according to an embodiment of the present disclosure, which includes a processor, a memory, and a program stored on the memory and executable on the processor, where when executing the program, the processor performs the steps of the method for enhancing brightness and contrast of a video image.

The electronic devices in the present disclosure may be a server, personal computer (PC), PAD, or mobile phone.

A computer program product is also provided according to the present disclosure, which, when being executed on a data processing device, is configured to execute a program initialized with the steps of the method for enhancing brightness and contrast of a video image.

Those skilled in the art should appreciate that embodiments of the present disclosure can be implemented as a method, a system, or a computer program product. Thus, the present disclosure may be implemented in the form of software, hardware or a combination of both. In addition, the present disclosure may be implemented in the form of one or more computer program products implemented on a computer usable storage medium (including but not limited to disk, CD-ROM, optical memory, etc.) containing computer accessible program codes.

The present disclosure is described with reference to a flowchart and/or a block diagram of a method, a device (a system), and a computer program product according to embodiments of the present disclosure. It is understood that each process and/or block in the flowchart and/or the block diagram, and a combination of the process and/or the block in the flowchart and/or the block diagram can be implemented by computer program instructions. These computer program instructions can be provided to a processor for a general-purpose computer, a special-purpose computer, an embedded processing machine or any other programmable data processing device to form a machine, so that the instructions executed by the processor of the computer or any other programmable data processing device enables the device to implement the functions specified in one or more flows in the flowcharts and/or one or more blocks in the block diagrams.

The computer program instructions may also be stored in a computer readable memory that can guide a computer or any other programmable data processing device to operate in a particular manner, such that the instructions stored in the computer readable memory enables a product including an instructing apparatus. The instructing apparatus implements the functions specified in one or more flows in the flowcharts and/or one or more blocks in the block diagrams.

The computer program instructions may also be loaded onto a computer or any other programmable data processing device, such that a series of operational steps are performed on the computer or any other programmable device to produce computer-implemented processing. Thereby, the instructions executed on the computer or any other programmable device provides steps for implementing the functions specified in one or more flows in the flowcharts and/or one or more blocks in the block diagrams.

In a typical configuration, a computing device includes one or more processors (CPUs), an input/output interface, a network interface, and a memory.

The memory may include a volatile memory, a random access memory (RAM), and/or a non-volatile memory among computer readable media. For example, the memory is a read only memory (ROM) or a flash memory. The memory is an example of the computer readable media.

The computer readable medium includes non-volatile medium, volatile medium, removable medium and non-removable medium. Information storage may be implemented by any method or technology. The information may be computer readable instructions, data structures, modules of programs, or other data. Examples of the computer storage medium include, but are not limited to: a phase change memory (PRAM), a static random access memory (SRAM), a dynamic random access memory (DRAM), or other types of random access memory (RAM); a read only memory. (ROM), an electrically erasable programmable read only memory (EEPROM), flash memory, or a memory with another memory technology; a compact disk read only memory (CD-ROM), a digital versatile disk (DVD) or any other optical storage; a magnetic tape cartridge, a magnetic tape storage or any other magnetic storage devices; or any other non-transmissive medium capable to store information that can be accessed by a computing device. As defined herein, the computer readable medium does not include a transitory computer-readable medium (transitory media), such as modulated data signals and carrier waves.

It should be noted that the terms such as "include", "comprise" or any other variants thereof means to be non-exclusive, so that a process, a method, an article or a device including a series of elements include not only the disclosed elements but also other elements that are not explicitly enumerated or inherent elements of the process, the method, the article or the device. Unless expressively limited, the statement "including a . . . " does not exclude the case that other similar elements may exist in the process, the method, the article or the device other than enumerated elements.

Hereinabove illustrated are merely some embodiments of the present disclosure, and the present disclosure is not limited thereto. Various changes and modifications can be made to the present disclosure by those skilled in the art. Any modifications, equivalents, improvements, and the like made within the spirit and scope of the present disclosure shall fall within the scope of the claims of the present disclosure.

The invention claimed is:

1. A method for enhancing brightness and contrast of a video image, the method comprising:
    obtaining a brightness component of an image frame to be processed;
    determining, based on the brightness component of the image frame to be processed, an inflection point, a truncation point, a maximum value of the brightness component and a minimum value of the brightness component of the image frame to be processed, wherein the inflection point is a point where an input brightness component is equal to an output brightness component in an interval of the brightness component of the image frame to be processed, the interval of the brightness component requiring contrast enhancement;
    determining a piecewise linear function based on the inflection point, the truncation point, the maximum value of the brightness component and the minimum value of the brightness component; and
    performing brightness and contrast enhancement processing on the image frame to be processed based on the piecewise linear function.

2. The method according to claim 1, wherein determining, based on the brightness component of the image frame to be processed, the inflection point and the truncation point of the image frame to be processed comprises:
    determining a type of the image frame to be processed based on the brightness component of the image frame to be processed;
    determining a target way of determination corresponding to the type of the image frame to be processed; and
    determining the inflection point and the truncation point of the image frame to be processed in the target way of determination.

3. The method according to claim 2, wherein determining the type of the image frame to be processed based on the brightness component of the image frame to be processed comprises:
    making statistics of the brightness component of the image frame to be processed to obtain a statistical result;
    determining, based on the statistical result, a trend mark value of the image frame to be processed, wherein the trend mark value comprises a low brightness mark value, a medium brightness mark value, and a high brightness mark value; and
    determining the type of the image frame to be processed based on the trend mark value of the image frame to be processed.

4. The method according to claim 3, wherein making the statistics of the brightness component of the image frame to be processed to obtain the statistical result comprises:
    determining, from a first pixel to a last pixel of the image frame to be processed sequentially, an $n^{th}$ grayscale order that a brightness value of a brightness component of a current pixel falls into, wherein n is an integer greater than or equal to 1 and less than or equal to 32;
    increasing a count of a first-order statistical counter corresponding to the $n^{th}$ grayscale order by one;
    determining whether the count of the first-order statistical counter corresponding to the $n^{th}$ grayscale order is equal to a width of the image frame to be processed;
    increasing a count of a second-order statistical counter corresponding to the $n^{th}$ grayscale order by one, in a case that the count of the first-order statistical counter corresponding to the $n^{th}$ grayscale order is equal to the width of the image frame to be processed; and
    determining counts of thirty-two first-order statistical counters and counts of thirty-two second-order statistical counters that are included in thirty-two grayscale orders as the statistical result.

5. The method according to claim 4, wherein determining, based on the statistical result, the trend mark value of the image frame to be processed comprises:
    calculating a sum sum2_all of the counts of the thirty-two second-order statistical counters;
    calculating a sum sum2_l of counts of sixteen second-order statistical counters included in a low field of grayscale orders;
    calculating a sum sum2_m of counts of sixteen second-order statistical counters included in a middle field of grayscale orders;
    calculating a sum sum2_h of counts of sixteen second-order statistical counters included in a high field of grayscale orders; and
    calculating the trend mark value of the image frame to be processed according to following formula:

$$ted\_l = \begin{cases} 1, & if(sum2\_l - sum2\_h) > (sum\_all/4) \\ 0, & others \end{cases}$$

$$ted\_h = \begin{cases} 1, & if(sum2\_h - sum2\_l) > (sum\_all/4) \\ 0, & others \end{cases}$$

$$ted\_m = \begin{cases} 1, & if: sum2\_m > sum2\_all/2 \\ 2, & else\ if: sum2\_m > sum2\_all/4 ; \\ 0, & others \end{cases}$$

wherein the low field of grayscale orders comprises first to sixteenth grayscale orders, the middle field of grayscale orders comprises ninth to twenty-fourth grayscale orders, the high field of grayscale orders comprises seventeenth to thirty-second grayscale orders, ted_l is the low brightness mark value, ted_m is the medium brightness mark value, and ted_h is the high brightness mark value.

6. The method according to claim 5, wherein determining the type of the image frame to be processed based on the trend mark value of the image frame to be processed comprises:
    determining that the type of the image frame to be processed is a first type, in case that the ted_l is equal to 1, the ted_m is equal to 0 and the ted_h is equal to 0, wherein a pixel concentrated area corresponding to the first type is an interval from 0 to 63;
    determining that the type of the image frame to be processed is a second type, in case that the ted_l is equal to 1, the ted_m is equal to 1 and the ted_h is equal to 0, wherein a pixel concentrated area corresponding to the second type is an interval from 64 to 127;
    determining that the type of the image frame to be processed is a third type, in case that the ted_l is equal to 1, the ted_m is equal to 2 and the ted_h is equal to 0, wherein a pixel concentrated area corresponding to the third type is an interval from 0 to 127;
    determining that the type of the image frame to be processed is a fourth type, in case that the ted_h is equal to 1, the ted_m is equal to 0 and the ted_l is equal to 0, wherein a pixel concentrated area corresponding to the fourth type is an interval from 192 to 255;

determining that the type of the image frame to be processed is a fifth type, in case that the ted_h is equal to 1, the ted_m is equal to 1 and the ted_l is equal to 0, wherein a pixel concentrated area corresponding to the fifth type is an interval from 128 to 191;

determining that the type of the image frame to be processed is a sixth type, in case that the ted_h is equal to 1, the ted_m is equal to 2 and the ted_l is equal to 0, wherein a pixel concentrated area corresponding to the sixth type is an interval from 128 to 255;

determining that the type of the image frame to be processed is a seventh type, in case that the ted_l is equal to 0, the ted_h is equal to 0 and the ted_m is equal to 0, wherein a pixel concentrated area corresponding to the seventh type is an interval from 64 to 191;

determining that the type of the image frame to be processed is an eighth type, in case that the ted_l is equal to 0, the ted_h is equal to 0 and the ted_m is equal to 1, wherein a pixel concentrated area corresponding to the eighth type is an interval from 0 to 255; and determining that the type of the image frame to be processed is a ninth type, in case that the ted_l is equal to 0, the ted_h is equal to 0 and the ted_m is equal to 2, wherein a pixel concentrated area corresponding to the ninth type is an interval from 192 to 255.

7. The method according to claim 6, wherein determining the target way of determination corresponding to the type of the image frame to be processed comprises:

determining, in case that the type of the image frame to be processed is the first type, that the target way of determination comprises: the inflection point is a medium brightness point corresponding to a maximum count of second-order statistical counters in the interval from 0 to 63, a distance between a low truncation point and the inflection point is equal to or less than 12 unit brightness gaps, a distance between a high truncation point and the inflection point is equal to or less than 32 unit brightness gaps and k is 1.25 or 1.325 in the interval from 0 to 63;

determining, in case that the type of the image frame to be processed is the second type, that the target way of determination comprises: the inflection point is intermediate medium brightness point corresponding to a maximum count of second-order statistical counters in the interval from 64 to 127, the distance between the low truncation point and the inflection point is equal to or less than 36 unit brightness gaps, the distance between the high truncation point and the inflection point is equal to or less than 36 unit brightness gaps and k is 1.25 or 1.325 in the interval from 64 to 127;

determining, in case that the type of the image frame to be processed is the third type, that the target way of determination comprises: the inflection point is a medium brightness point corresponding to a maximum count of second-order statistical counters in the interval from 0 to 127, the distance between the low truncation point and the inflection point is equal to or less than 36 unit brightness gaps, the distance between the high truncation point and the inflection point is equal to or less than 68 unit brightness gaps and k is 1.125 or 1.25 in the interval from 0 to 127;

determining, in case that the type of the image frame to be processed is the fourth type, that the target way of determination comprises: the inflection point is a medium brightness point corresponding to a maximum count of second-order statistical counters in the interval from 192 to 255, the distance between the low truncation point and the inflection point is equal to or less than 32 unit brightness gaps, the distance between the high truncation point and the inflection point is equal to or less than 12 unit brightness gaps and k is 1.25 or 1.325 in the interval from 192 to 255;

determining, in case that the type of the image frame to be processed is the fifth type, that the target way of determination comprises: the inflection point is a medium brightness point corresponding to a maximum count of second-order statistical counters in the interval from 128 to 191, the distance between the low truncation point and the inflection point is equal to or less than 40 unit brightness gaps, the distance between the high truncation point and the inflection point is equal to or less than 32 unit brightness gaps and k is 1.25 or 1.325 in the interval from 128 to 191;

determining, in case that the type of the image frame to be processed is the sixth type, that the target way of determination comprises: the inflection point is a medium brightness point corresponding to a maximum count of second-order statistical counters in the interval from 128 to 255, the distance between the low truncation point and the inflection point is equal to or less than 68 unit brightness gaps, the distance between the high truncation point and the inflection point is equal to or less than 63 unit brightness gaps and k is 1.125 or 1.25 in the interval from 128 to 255;

determining, in case that the type of the image frame to be processed is the seventh type, that the target way of determination comprises: the inflection point is a medium brightness point corresponding to a maximum count second-order statistical counters in the interval from 64 to 191, the distance between the low truncation point and the inflection point is equal to or less than 20 unit brightness gaps, the distance between the high truncation point and the inflection point is equal to or less than 20 unit brightness gaps, the low truncation point and the high truncation point are located in an interval comprising the interval from 64 to 191 and k is 1.25 or 1.325 in the interval from 64 to 191;

determining, in case that the type of the image frame to be processed is the eighth type, that the target way of determination comprises: the inflection point is a medium brightness point corresponding to a maximum count of second-order statistical counters in the interval from 0 to 255, the truncation point is 0 and 255 and k is 1.125 or 1.25 in the interval from 0 to 255; and determining, in case that the type of the image frame to be processed is the ninth type, that the target way of determination comprises: two inflection points are medium brightness points corresponding to maximum counts of second-order statistical counters in the interval from 0 to 64 and in the interval from 192 to 255, respectively, the truncation point is located in an interval comprising the interval from 0 to 64 and the interval from 192 to 255 and k is 1.125 or 1.25 in the interval from 0 to 64 and in the interval from 192 to 255, wherein k is a slope.

8. A device for enhancing brightness and contrast of a video image, the device comprising:

a brightness component obtaining unit, configured to obtain a brightness component of an image frame to be processed;

a parameter determination unit, configured to determine, based on the brightness component of the image frame to be processed, an inflection point, a truncation point, a maximum value of the brightness component and a minimum value of the brightness component of the image frame to be processed, wherein the inflection point is a point where an input brightness component is equal to an output brightness component in an interval of the brightness component of the image frame to be processed, the interval of the brightness component requiring contrast enhancement;

a piecewise linear function determination unit, configured to determine a piecewise linear function based on the inflection point, the truncation point, the maximum value of the brightness component and the minimum value of the brightness component; and a brightness and contrast enhancement processing unit, configured to perform brightness and contrast enhancement processing on the image frame to be processed based on the piecewise linear function.

9. The device according to claim 8, wherein the parameter determination unit comprises:

a type determination subunit, configured to determine a type of the image frame to be processed based on the brightness component of the image frame to be processed;

a subunit for determining way of determination, configured to determine a target way of determination corresponding to the type of the image frame to be processed; and a parameter determination subunit, configured to determine the inflection point and the truncation point of the image frame to be processed in the target way of determination.

10. The device according to claim 9, wherein the type determination subunit is configured to:

make statistics of the brightness component of the image frame to be processed to obtain a statistical result;

determine, based on the statistical result, a trend mark value of the image frame to be processed, wherein the trend mark value comprises a low brightness mark value, a medium brightness mark value, and a high brightness mark value; and determine the type of the image frame to be processed based on the trend mark value of the image frame to be processed.

11. The device according to claim 10, wherein the type determination subunit is configured to:

determine, from a first pixel to a last pixel of the image frame to be processed sequentially, an $n^{th}$ grayscale order that a brightness value of a brightness component of a current pixel falls into, wherein n is an integer greater than or equal to 1 and less than or equal to 32;

increase a count of a first-order statistical counter corresponding to the $n^{th}$ grayscale order by one;

determine whether the count of the first-order statistical counter corresponding to the $n^{th}$ grayscale order is equal to a width of the image frame to be processed;

increase a count of a second-order statistical counter corresponding to the $n^{th}$ grayscale order by one, in a case that the count of the first-order statistical counter corresponding to the $n^{th}$ grayscale order is equal to the width of the image frame to be processed; and determine counts of thirty-two first-order statistical counters and counts of thirty-two second-order statistical counters that are included in thirty-two grayscale orders as the statistical result.

12. The device according to claim 11, wherein the type determination subunit is configured to:

calculate a sum sum2_all of the counts of the thirty-two second-order statistical counters;

calculate a sum sum2_l of counts of sixteen second-order statistical counters included in a low field of grayscale orders;

calculate a sum sum2_m of counts of sixteen second-order statistical counters included in a middle field of grayscale orders;

calculate a sum sum2_h of counts of sixteen second-order statistical counters included in a high field of grayscale orders; and calculate the trend mark value of the image frame to be processed according to following formula:

$$ted\_l = \begin{cases} 1, & \text{if}(sum2\_l - sum2\_h) > (sum\_all/4) \\ 0, & \text{others} \end{cases}$$

$$ted\_h = \begin{cases} 1, & \text{if}(sum2\_h - sum2\_l) > (sum\_all/4) \\ 0, & \text{others} \end{cases}$$

$$ted\_m = \begin{cases} 1, & \text{if: } sum2\_m > sum2\_all/2 \\ 2, & \text{else if: } sum2\_m > sum2\_all/4 \\ 0, & \text{others} \end{cases}$$

wherein the low field of grayscale orders comprises first to sixteenth grayscale orders, the middle field of grayscale orders comprises ninth to twenty-fourth grayscale orders, the high field of grayscale orders comprises seventeenth to thirty-second grayscale orders, ted_l is the low brightness mark value, ted_m is the medium brightness mark value, and ted_h is the high brightness mark value.

13. The device according to claim 12, wherein the type determination subunit is configured to:

determine that the type of the image frame to be processed is a first type in case that the ted_l is equal to 1, the ted_m is equal to 0, and the ted_h is equal to 0, wherein a pixel concentrated area corresponding to the first type is an interval from 0 to 63;

determine that the type of the image frame to be processed is a second type in case that the ted_l is equal to 1, the ted_m is equal to 1, and the ted_h is equal to 0, wherein a pixel concentrated area corresponding to the second type is an interval from 64 to 127;

determine that the type of the image frame to be processed is a third type in case that the ted_l is equal to 1, the ted_m is equal to 2, and the ted_h is equal to 0, wherein a pixel concentrated area corresponding to the third type is an interval from 0 to 127;

determine that the type of the image frame to be processed is a fourth type in case that the ted_h is equal to 1, the ted_m is equal to 0, and the ted_l is equal to 0, wherein a pixel concentrated area corresponding to the fourth type is an interval from 192 to 255;

determine that the type of the image frame to be processed is a fifth type in case that the ted_h is equal to 1, the ted_m is equal to 1, and the ted_l is equal to 0, wherein a pixel concentrated area corresponding to the fifth type is an interval from 128 to 191;

determine that the type of the image frame to be processed is a sixth type in case that the ted_h is equal to 1, the ted_m is equal to 2, and the ted_l is equal to 0, wherein a pixel concentrated area corresponding to the sixth type is an interval from 128 to 255;

determine that the type of the image frame to be processed is a seventh type in case that the ted_l is equal to 0, the ted_h is equal to 0, and the ted_m is equal to 0, wherein a pixel concentrated area corresponding to the seventh type is an interval from 64 to 191;

determine that the type of the image frame to be processed is an eighth type in case that the ted_l is equal to 0, the ted_h is equal to 0, and the ted_m is equal to 1, wherein a pixel concentrated area corresponding to the eighth type is an interval from 0 to 255; and determine that the type of the image frame to be processed is a ninth type in case that the ted_l is equal to 0, the ted_h is equal to 0, and the ted_m is equal to 2, wherein a pixel concentrated area corresponding to the ninth type is an interval from 192 to 255.

14. The device according to claim 13, wherein the subunit for determining way of determination is configured to:

determine, in case that the type of the image frame to be processed is the first type, that the target way of determination comprises: the inflection point is a medium brightness point corresponding to a maximum count of second-order statistical counters in the interval from 0 to 63, a distance between a low truncation point and the inflection point is equal to or less than 12 unit brightness gaps, a distance between a high truncation point and the inflection point is equal to or less than 32 unit brightness gaps and k is 1.25 or 1.325 in the interval from 0 to 63;

determine, in case that the type of the image frame to be processed is the second type, that the target way of determination comprises: the inflection point is intermediate medium brightness point corresponding to a maximum count of second-order statistical counters in the interval from 64 to 127, the distance between the low truncation point and the inflection point is equal to or less than 36 unit brightness gaps, the distance between the high truncation point and the inflection point is equal to or less than 36 unit brightness gaps and k is 1.25 or 1.325 in the interval from 64 to 127;

determine, in case that the type of the image frame to be processed is the third type, that the target way of determination comprises: the inflection point is a medium brightness point corresponding to a maximum count of second-order statistical counters in the interval from 0 to 127, the distance between the low truncation point and the inflection point is equal to or less than 36 unit brightness gaps, the distance between the high truncation point and the inflection point is equal to or less than 68 unit brightness gaps and k is 1.125 or 1.25 in the interval from 0 to 127;

determine, in case that the type of the image frame to be processed is the fourth type, that the target way of determination comprises: the inflection point is a medium brightness point corresponding to a maximum count of second-order statistical counters in the interval from 192 to 255, the distance between the low truncation point and the inflection point is equal to or less than 32 unit brightness gaps, the distance between the high truncation point and the inflection point is equal to or less than 12 unit brightness gaps and k is 1.25 or 1.325 in the interval from 192 to 255;

determine, in case that the type of the image frame to be processed is the fifth type, that the target way of determination comprises: the inflection point is a medium brightness point corresponding to a maximum count of second-order statistical counters in the interval from 128 to 191, the distance between the low truncation point and the inflection point is equal to or less than 40 unit brightness gaps, the distance between the high truncation point and the inflection point is equal to or less than 32 unit brightness gaps and k is 1.25 or 1.325 in the interval from 128 to 191;

determine, in case that the type of the image frame to be processed is the sixth type, that the target way of determination comprises: the inflection point is a medium brightness point corresponding to a maximum count of second-order statistical counters in the interval from 128 to 255, the distance between the low truncation point and the inflection point is equal to or less than 68 unit brightness gaps, the distance between the high truncation point and the inflection point is equal to or less than 63 unit brightness gaps and k is 1.125 or 1.25 in the interval from 128 to 255;

determine, in case that the type of the image frame to be processed is the seventh type, that the target way of determination comprises: the inflection point is a medium brightness point corresponding to a maximum count second-order statistical counters in the interval from 64 to 191, the distance between the low truncation point and the inflection point is equal to or less than 20 unit brightness gaps, the distance between the high truncation point and the inflection point is equal to or less than 20 unit brightness gaps, the low truncation point and the high truncation point are located in an interval including the interval from 64 to 191 and k is 1.25 or 1.325 in the interval from 64 to 191;

determine, in case that the type of the image frame to be processed is the eighth type, that the target way of determination comprises: the inflection point is a medium brightness point corresponding to a maximum count of second-order statistical counters in the interval from 0 to 255, the truncation point is 0 and 255 and k is 1.125 or 1.25 in the interval from 0 to 255; and determine, in case that the type of the image frame to be processed is the ninth type, that the target way of determination comprises: two inflection points are medium brightness points corresponding to maximum counts of second-order statistical counters in the interval from 0 to 64 and in the interval from 192 to 255, respectively, the truncation point is located in an interval including the interval from 0 to 64 and the interval from 192 to 255 and k is 1.125 or 1.25 in the interval from 0 to 64 and in the interval from 192 to 255, wherein k is a slope.

15. A non-transitory storage medium, wherein a program is stored on the non-transitory storage medium, and, when being executed by a processor, the program configures the processor to perform the method for enhancing brightness and contrast of a video image according to claim 1.

16. An electronic device comprising a memory and a processor, wherein the memory is configured to store a program, and the processor is configured to execute the program to perform the method for enhancing brightness and contrast of a video image according to claim 1.

* * * * *